(12) United States Patent
Gonzales et al.

(10) Patent No.: US 9,362,654 B2
(45) Date of Patent: Jun. 7, 2016

(54) ENERGY STORAGE DEVICE SERVICE INTERLOCK

(71) Applicant: FORD GLOBAL TECHNOLOGIES, LLC, Dearborn, MI (US)

(72) Inventors: Philip M. Gonzales, Dearborn, MI (US); Edward P. Mcleskey, Pinckney, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 282 days.

(21) Appl. No.: 14/282,056

(22) Filed: May 20, 2014

(65) Prior Publication Data

US 2015/0340794 A1 Nov. 26, 2015

(51) Int. Cl.
| | |
|---|---|
| *B60L 11/18* | (2006.01) |
| *H01R 13/447* | (2006.01) |
| *H01R 13/629* | (2006.01) |
| *H01R 13/639* | (2006.01) |
| *H01R 13/66* | (2006.01) |
| *B60L 3/00* | (2006.01) |

(52) U.S. Cl.
CPC ............... *H01R 13/447* (2013.01); *B60L 3/00* (2013.01); *B60L 11/1818* (2013.01); *H01R 13/629* (2013.01); *H01R 13/6397* (2013.01); *H01R 13/6608* (2013.01); *Y10T 29/49817* (2015.01)

(58) Field of Classification Search
CPC .......... Y10T 29/49817; H01R 13/447; H01R 13/6397; H01R 13/6608; H01R 13/629; B60L 11/18
USPC .......................... 200/43.08; 439/34; 29/426.1
See application file for complete search history.

(56) References Cited

U.S. PATENT DOCUMENTS

| | | | |
|---|---|---|---|
| 7,893,809 B2 | 2/2011 | Head | |
| 8,022,320 B2 | 9/2011 | Matsumoto et al. | |
| 8,373,390 B2 | 2/2013 | Oh et al. | |
| 2006/0019541 A1 | 1/2006 | Maguire et al. | |
| 2010/0271168 A1 | 10/2010 | Niedzwiecki et al. | |
| 2012/0321934 A1 | 12/2012 | Hopkins et al. | |
| 2013/0012051 A1 | 1/2013 | Boyer | |
| 2013/0063151 A1 | 3/2013 | Karlsson et al. | |
| 2013/0263632 A1* | 10/2013 | Muller | E05B 19/0082 70/400 |
| 2015/0207130 A1* | 7/2015 | Maguire | H01M 2/1083 429/97 |

FOREIGN PATENT DOCUMENTS

| | | | |
|---|---|---|---|
| EP | 2423939 A2 | 2/2012 | |
| JP | 2002008613 A * | 1/2002 | H01M 2/10 |

* cited by examiner

*Primary Examiner* — Edwin A. Leon
(74) *Attorney, Agent, or Firm* — David B. Kelley; MacMillan, Sobanski & Todd, LLC

(57) ABSTRACT

An energy storage device and electrical component are secured under an access cover by a lock. A handle has a key portion that operates the lock. Removal of the handle from an electrical disconnect isolates the component electrically from the energy storage device. The lock is located such that the handle is removed from the disconnect to operate the lock.

19 Claims, 2 Drawing Sheets

ENERGY STORAGE DEVICE SERVICE INTERLOCK

BACKGROUND OF INVENTION

The present invention relates to electrified vehicle batteries and in particular to interlocking a cover and electrical disconnect for the batteries.

Typically, in an electrified vehicle, the energy storage device, for example a battery, is secured under a battery cover to prevent unauthorized access to the battery, which may be a high voltage battery. The vehicle typically also has a disconnect switch, having open and closed positions, for the battery. When the disconnect switch is open, the battery is electrically isolated. Some vehicle battery systems, then, are designed with a sensing circuit (interlock circuit) to detect when an access cover is being removed. This detection may include a switch connected to the cover or extra sheet metal extensions that interact with a manual service disconnect device to provide feedback that a cover is being removed. This extra sheet metal, switches, and circuitry may be more costly than desired and potentially more complicated than desired.

SUMMARY OF INVENTION

An embodiment contemplates an energy storage device service interlock for an electrified vehicle. The interlock comprises an energy storage device, an electrical component, an access cover, a handle having a key portion, and a lock. The access cover is over the electrical component and energy storage device. The electrical disconnect electrically isolates the component from the energy storage device when the handle is removed from the disconnect. The lock is configured to secure the cover to prevent access to the component and energy storage device and is located such that the handle is removed from the disconnect for the key portion to operate the lock to open the cover.

Another embodiment contemplates a method of interlocking an energy storage device for an electrified vehicle. A lock for securing an access cover over an electrical component and the energy storage device is operated with a key portion of a handle The energy storage device is electrically isolated from the component by removing the handle from an electrical disconnect. The lock and disconnect are located such that the handle is removed from the disconnect to operate the lock.

An advantage of an embodiment is that the electrical component is electrically isolated from the energy storage device when the cover is opened while reducing extra switches and circuitry.

DETAILED DESCRIPTION

Figure 1:
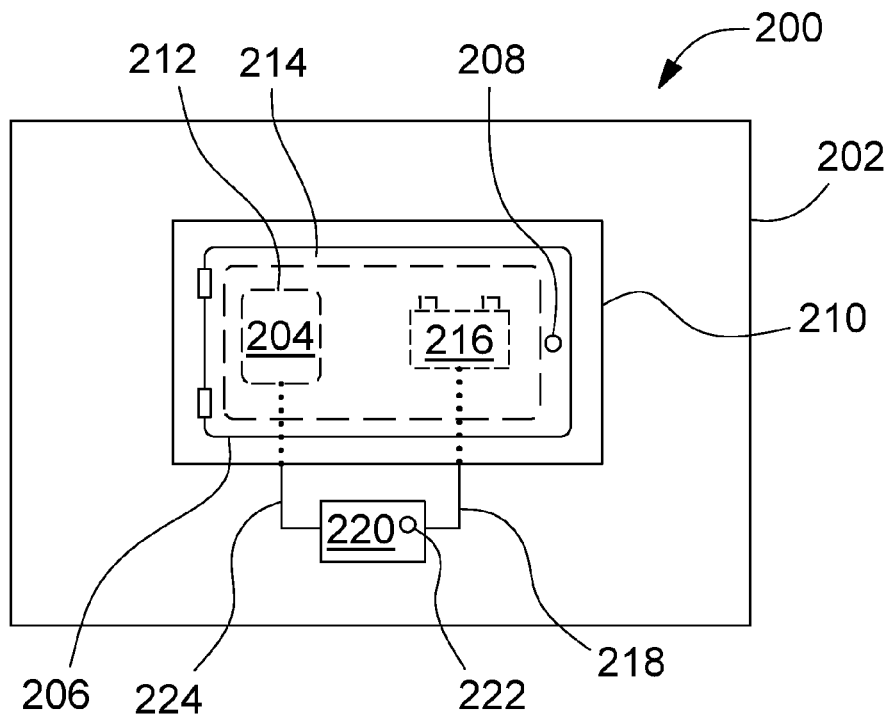
FIG. 1 is a schematic view of an energy storage device interlock.

FIG. 1 schematically illustrates a first energy storage device service interlock 200 for an electrified vehicle 202. The electrified vehicle 202 may be an electric vehicle, a hybrid electric vehicle, a plug-in hybrid electric vehicle, a fuel cell vehicle, or another electrified vehicle known to one skilled in the art.

An electrical component 204 and an energy storage device 216 (illustrated by hidden lines) are secured behind an access cover 206. The energy storage device 216 may be, for example, a high voltage battery or an ultra-capacitor system. The electrical component 204 may be, for example, a battery controller, a battery output switching device, a DC/DC converter, an on-board charger for the energy storage device 216, or other elements of a high voltage system. As illustrated, the cover 206 is a hinged door. The cover 206 may also be any suitable access cover known to one skilled in the art. For example, the cover 206 may be an access panel that is lifted free to give access to the component 204 and energy storage device 216. The cover 206 has an open position which permits access to the component 204 and energy storage device 216 and a closed position which prevents access to the component 204 and energy storage device 216. The cover 206 has a lock 208 which secures the cover 206 in the closed position to a housing 210.

The housing 210 has a recess 212 in which the component 204 and energy storage device 216 are set. The housing 210 may also have a shoulder portion 214 extending behind the cover 206. As illustrated, the lock 208 secures the cover 206 to the shoulder 214 using a suitable means known to one skilled in the art. Alternatively, the lock 208 may secure the cover 206 directly to the housing 210 using a suitable means known to one skilled in the art.

The energy storage device 216 is electrically connected by an electrical connection 218 to an electrical disconnect switch 220. The disconnect switch 220 is a typical disconnect switch as understood by one skilled in the art and is commonly known as a disconnect, electrical disconnect, or manual service disconnect switch (MSD). The disconnect switch is located outside the cover 206 and has a removable handle 222. For example, the handle 222 may be part of the manual service disconnect switch. When the handle 222 is present in the disconnect 220, the disconnect switch 220 is closed and the energy storage device 216 is electrically connected, via the electrical connection 218, to an electrical bus 224. The bus 224 connects to the component 204. When the handle 222 is removed from the disconnect switch 220, the disconnect switch 220 is opened and the bus 224 is electrically isolated from the energy storage device 216.

The handle 222 has a first engagement area for operating the disconnect 220 and a second engagement area which is a key portion for operating the lock 208. The key portion operates the lock 208 such that the cover 206 may be placed in the open position and the component 104 accessed when the lock 208 is unlocked by the key portion. Alternatively, the handle 222 may have a single engagement area, which may be the key portion, that operates both the disconnect 222 and the lock 208.

The handle 222 incorporates the key portion such that the key portion cannot operate the lock 208 while the handle 222 is closing the disconnect switch 220 to energize the bus 224. That is, the handle 222 is removed from the disconnect switch 220 (which opens the disconnect switch 220 and electrically isolates the component 204) and then can be used to operate the lock 208 such that the cover 206 may be placed in the open position. For example, the lock 208 and the disconnect switch 220 may be physically separated and the handle 222 configured such that the handle 222 cannot reach to concurrently operate the lock 208 and disconnect switch 220.

Figure 2:
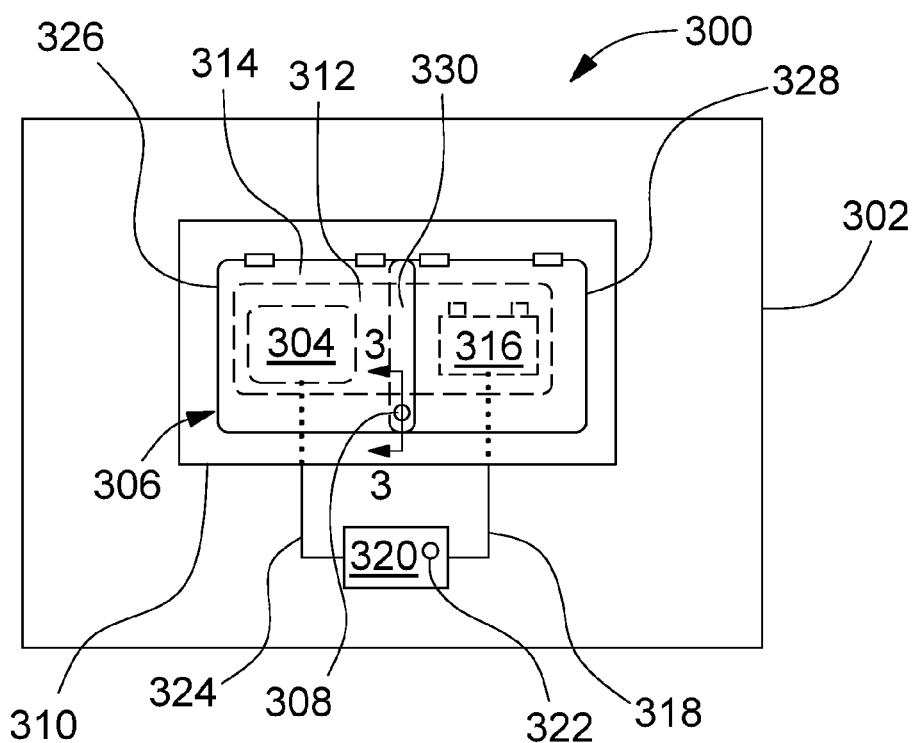
FIG. 2 is a schematic view of an energy storage device interlock.

FIG. 2 schematically illustrates a second energy storage device service interlock 300 for an electrified vehicle 302.

The electrified vehicle 302 may be an electric vehicle, a hybrid electric vehicle, a plug-in hybrid electric vehicle, a fuel cell vehicle, or another electrified vehicle known to one skilled in the art. Because the third interlock 300 is a variation of the first interlock 200 of FIG. 1, like reference numerals, incremented by 100, designate corresponding parts in the drawings and detailed description thereof will be omitted.

A cover 306 is comprised of a first pane 326 and a second pane 328. The first and second panes 326 and 328, respectively, overlap for an overlap portion 330 (illustrated by hidden lines) such that a lock 308 secures both the first and second panes 326 and 328, respectively, to a housing 310. As illustrated, the first pane 326 may be placed in an open position over a component 304 while the second pane 328 remains in a closed and secured position over an energy storage device 316. The lock 308 and a key portion for the lock 308 may be configured to selectively unlock the first pane 326 or the second pane 328. Furthermore, additional panes to the first and second panes 326 and 328, respectively, may comprise the cover 306. The additional panes may be used with a single lock or multiple locks in multiple overlap portions.

The handle 322 and lock 308 are employed in the same way as the first embodiment. That is, the first engagement area engages the disconnect switch 320 to open or close the disconnect switch 320, while the key portion of the handle 322 can only engage the lock 308 when the first engagement area is disengaged from the disconnect switch 320. Alternatively, the handle 322 may have a single engagement area, which may be the key portion, that operates both the disconnect 320 and the lock 308.

Figure 3:
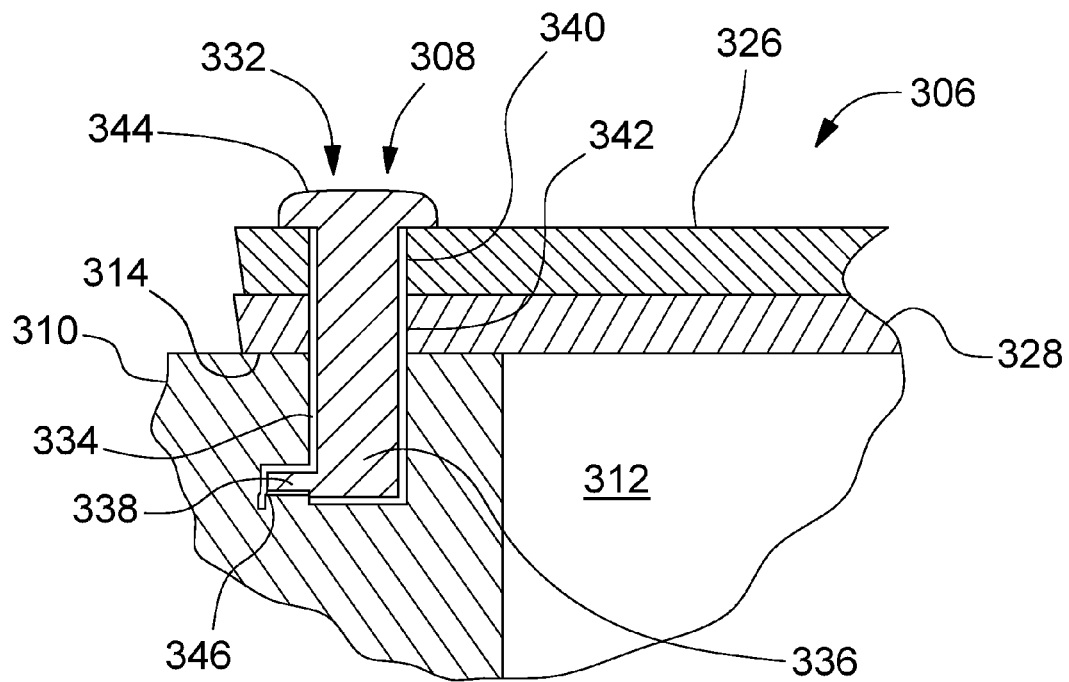
FIG. 3 is a schematic sectional view along line 3-3 of FIG. 2.

FIG. 3 schematically illustrates a section of the second interlock 300, taken along a line 3-3 of FIG. 2.

The lock 308 comprises a rotatable pin 332 in a slot 334. The slot 334 is in the housing 310. The pin 332 includes a cylinder body 336 and a tab portion 338. The slot 334, a first opening 340 in the first pane 326, and a second opening 342 in the second pane 328 all include a keyhole to fit the cylinder body 336 and tab 338. The pin 332 includes a head 344. The head 344 has a greater diameter than the slot 334, the first opening 340, and the second opening 342. The head 344 retains the first and second panes 326 and 328, respectively, to the housing 310. The housing includes a detent 346. The pin 332 is rotatable such that, as understood by one skilled in the art, the tab 338 engages with the detent 346 to secure the pin 332 in the slot 334 and secure the cover 306 in the closed position.

Figure 4:
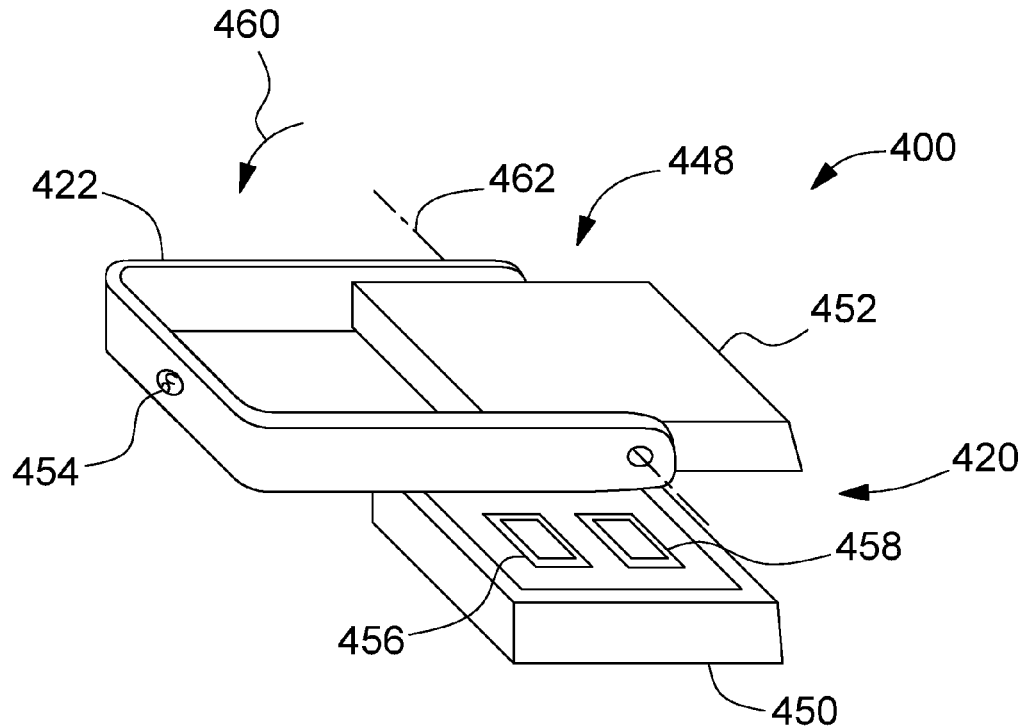
FIG. 4 is a schematic view of an electrical disconnect for use with the energy storage device interlocks of FIGS. 1 and 2.

FIG. 4 schematically illustrates an electrical disconnect switch system 400 which may be used with the first and second interlocks 200 and 300, respectively. Because the disconnect system 400 may be used with the first and second interlocks 200 and 300, respectively, like reference numerals designate corresponding parts in the drawings and detailed description thereof will be omitted.

A disconnect switch 420 comprises a manual service disconnect switch (MSD) 448 removable from a base 450. The manual service disconnect switch 448 includes a first engagement area 452 and a handle 422 having a second engagement area 454. The second engagement area 454 is a key portion for operating, as previously discussed, a lock for an access cover over an energy storage device and a battery.

The manual service disconnect switch 448 contains male mating halves and circuitry that completes an electrical circuit between first and second female mating halves 456 and 458, respectively, in the base 450. The first female mating half 456 connects, via an electrical connection, to an energy storage device and the second female mating half 458 connects, via an electrical bus, to an electrical component.

When the handle 422 is rotated in a direction 460 about an axis 462, and the manual service disconnect switch 448 is removed from the base 450, the male mating halves disconnect from the first and second female mating halves 456 and 458, respectively, and the component is electrically isolated from the energy storage device. Once removed from the base 450, the manual service disconnect switch 448 may be used, via the second engagement area 454, to operate the cover lock.

While certain embodiments of the present invention have been described in detail, those familiar with the art to which this invention relates will recognize various alternative designs and embodiments for practicing the invention as defined by the following claims.

The invention claimed is:

1. An energy storage device service interlock for an electrified vehicle comprising:
    an access cover over an electrical component and an energy storage device;
    a handle having a key portion;
    an electrical disconnect electrically isolating the component from the energy storage device when the handle is removed from the disconnect;
    a lock configured to secure the cover to prevent access to the component and energy storage device, and located such that the handle is removed from the disconnect for the key portion to operate the lock to open the cover.

2. The interlock of claim 1 wherein the lock comprises:
    a removable cylinder having a tab;
    openings in the cover and housing, fitted to the cylinder and tab;
    a slot in the housing to retain the cylinder, the cylinder being rotatable to engage the tab in the slot.

3. The interlock of claim 2 wherein a detent in the housing engages the tab in the slot.

4. The interlock of claim 2 wherein the cylinder further comprises:
    a first end having the tab;
    a second end, opposite the first end, having a cap of a greater diameter than the cover opening, the cap securing the cover to the housing.

5. The interlock of claim 1 wherein the access cover comprises first and second panes.

6. The interlock of claim 5 wherein the lock is further configured such that the first pane may be opened while the second pane remains secured.

7. The interlock of claim 5 wherein the first pane is over the electrical component and the second pane is over the energy storage device.

8. The interlock of claim 1 wherein an engagement portion of the handle, separate from the key portion, is removable from the disconnect to electrically isolate the energy storage device from the component.

9. The interlock of claim 1 wherein the key portion is removable from the disconnect to electrically isolate the energy storage device from the component.

10. The interlock of claim 1 wherein the energy storage device is a battery.

11. The interlock of claim 1 wherein the handle is part of a manual service disconnect switch and the component is isolated from the energy storage device when the manual service disconnect switch is removed from the disconnect.

12. A method of interlocking an energy storage device for an electrified vehicle comprising:
    operating, with a key portion of a handle, a lock for securing an access cover over an electrical component and the energy storage device;

isolating the energy storage device electrically from the component by removing the handle from an electrical disconnect, wherein the lock and disconnect are located such that the handle must be removed from the disconnect to operate the lock.

13. The method of claim 12 wherein the access cover comprises first and second panes.

14. The method of claim 13 further including the lock unlocking the first cover for opening while the second pane remains secured.

15. The method of claim 13 wherein the first pane is over the electrical component and the second pane is over the energy storage device.

16. The method of claim 12 further including, removing an engagement portion of the handle, separate from the key portion, from the disconnect to electrically isolate the energy storage device from the component.

17. The method of claim 12 further including, removing the key portion from the disconnect to electrically isolate the energy storage device from the component.

18. The method of claim 12 further including providing a battery as the energy storage device.

19. The method of claim 12 further comprising:
providing a manual service disconnect switch having the handle;
isolating the energy storage device from the component by removing the manual service disconnect switch, with the handle, from the electrical disconnect.

\* \* \* \* \*